(12) United States Patent
Huang et al.

(10) Patent No.: US 12,728,800 B2
(45) Date of Patent: Sep. 8, 2026

(54) VEHICLE WINDOW ASSEMBLY HAVING DISPLAY DEVICE

(71) Applicants: InnoLux Corporation, Jhu-Nan (TW); CARUX TECHNOLOGY PTE. LTD., Singapore (SG)

(72) Inventors: Yu-Chia Huang, Miao-Li County (TW); Tsung-Han Tsai, Miao-Li County (TW); Kuan-Feng Lee, Miao-Li County (TW); Li-Wei Sung, Tainan (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 418 days.

(21) Appl. No.: 18/476,527

(22) Filed: Sep. 28, 2023

(65) Prior Publication Data

US 2024/0157890 A1 May 16, 2024

(30) Foreign Application Priority Data

Nov. 11, 2022 (CN) ........................ 202211411027.0

(51) Int. Cl.
*B60R 11/02* (2006.01)
*B60J 1/20* (2006.01)
*B60R 11/00* (2006.01)

(52) U.S. Cl.
CPC ......... *B60R 11/0229* (2013.01); *B60J 1/2094* (2013.01); *B60R 11/0264* (2013.01); *B60R 2011/0026* (2013.01); *B60R 2011/0043* (2013.01)

(58) Field of Classification Search
CPC ................. B60R 11/0229; B60R 1/001; B60R 2011/0026; B60J 1/2094; G09F 9/30; G09F 9/33; G09F 9/335; G09F 9/35
See application file for complete search history.

(56) References Cited

U.S. PATENT DOCUMENTS 5,197,242 A * 3/1993 Baughman ........ B32B 17/10174 428/34
6,446,375 B1 * 9/2002 Davis ...................... G09F 3/203 40/591
6,580,472 B1 * 6/2003 Willingham ............... B60J 3/04 359/275
9,038,294 B2 * 5/2015 Meza ...................... G09F 13/06 40/491
9,874,747 B2 * 1/2018 Bar ........................... E06B 3/66
(Continued)

FOREIGN PATENT DOCUMENTS

CN 110626388 A 12/2019
CN 111223396 A 6/2020
CN 112519693 A 3/2021

OTHER PUBLICATIONS

Chinese language office action dated Aug. 6, 2024, issued in application No. TW 112121015.

*Primary Examiner* — Ismael Negron
(74) *Attorney, Agent, or Firm* — JCIPRNET

(57) ABSTRACT

A vehicle including a vehicle window assembly having a first signal element, a first protective element covering at least a portion of the first signal element, a first protective substrate, a second protective substrate, and a display panel disposed between the first protective substrate and the second protective substrate.

20 Claims, 12 Drawing Sheets

(56) References Cited

U.S. PATENT DOCUMENTS

| | | | | |
|---|---|---|---|---|
| 10,220,784 | B2 * | 3/2019 | Salter | B60Q 3/12 |
| 10,358,087 | B2 * | 7/2019 | Kurihara | B60J 1/02 |
| 10,427,503 | B2 * | 10/2019 | Snider | B60J 1/20 |
| 10,457,204 | B2 * | 10/2019 | Lobo | B60Q 3/80 |
| 10,982,487 | B2 * | 4/2021 | Ramirez | B60K 35/26 |
| 2005/0099287 | A1 * | 5/2005 | Su | B60Q 1/302 340/815.45 |
| 2018/0136895 | A1 * | 5/2018 | Harris | B60R 11/0229 |
| 2020/0023719 | A1 | 1/2020 | Snider | |
| 2022/0001724 | A1 | 1/2022 | Pohl | |
| 2024/0149781 | A1 * | 5/2024 | Sharif | G09F 21/04 |

* cited by examiner

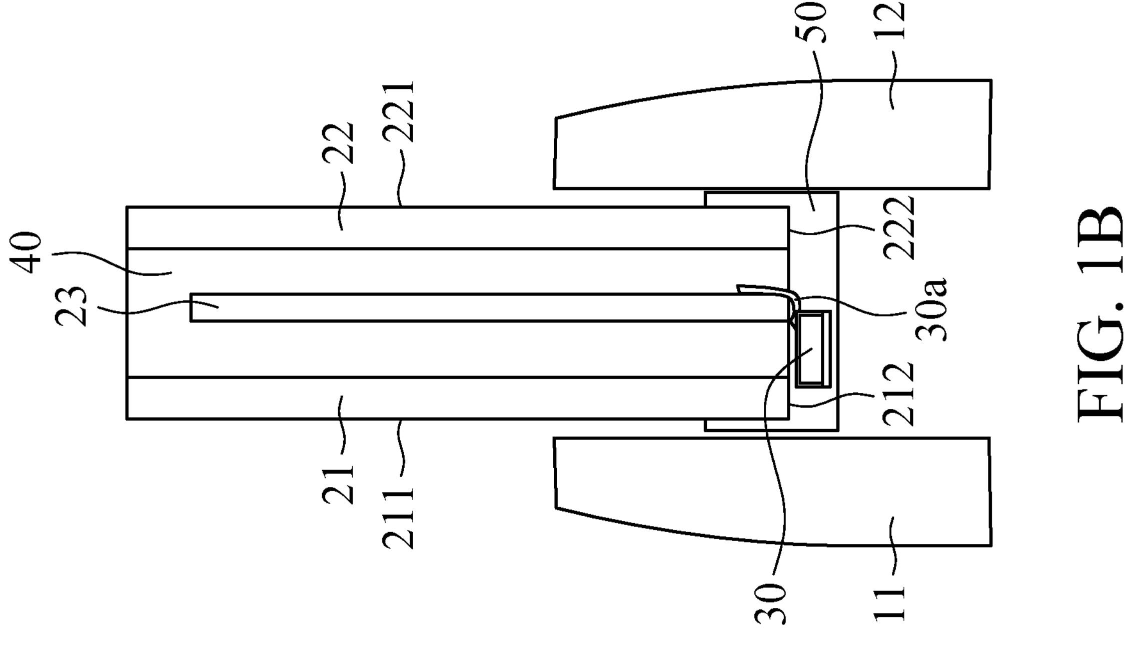
FIG. 1B
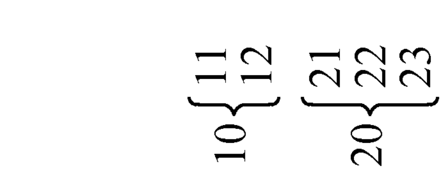
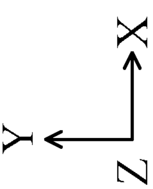

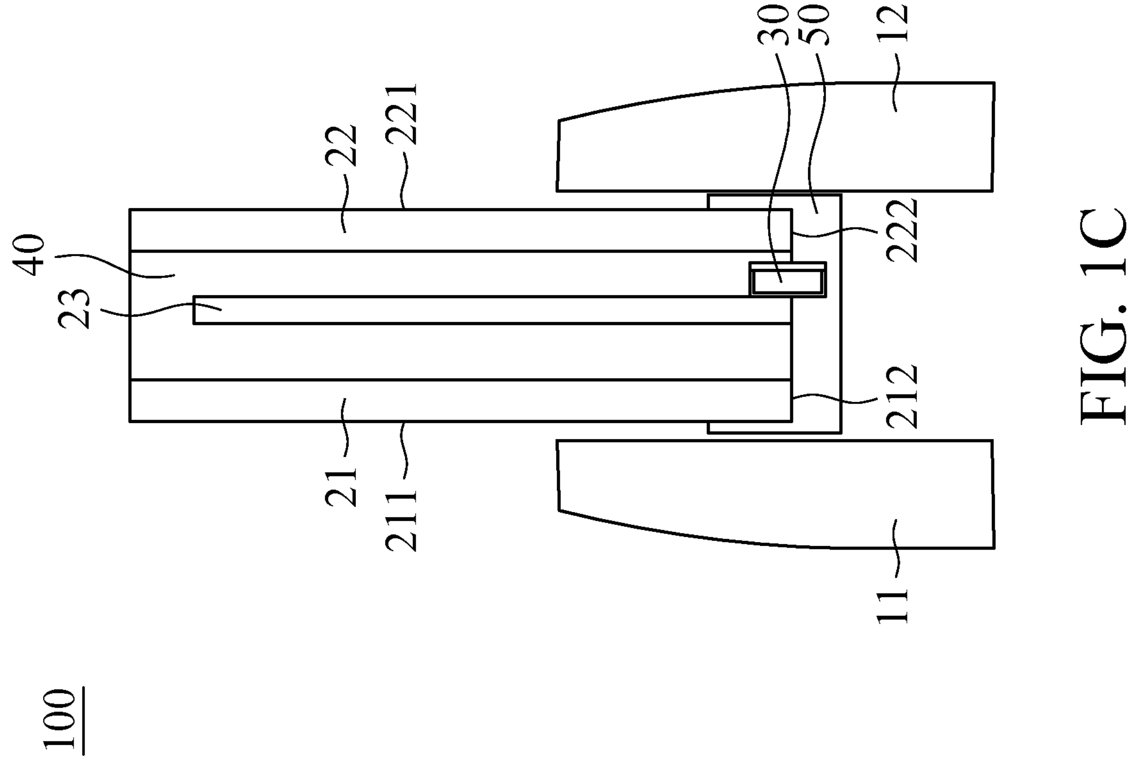
FIG. 1C
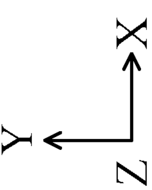

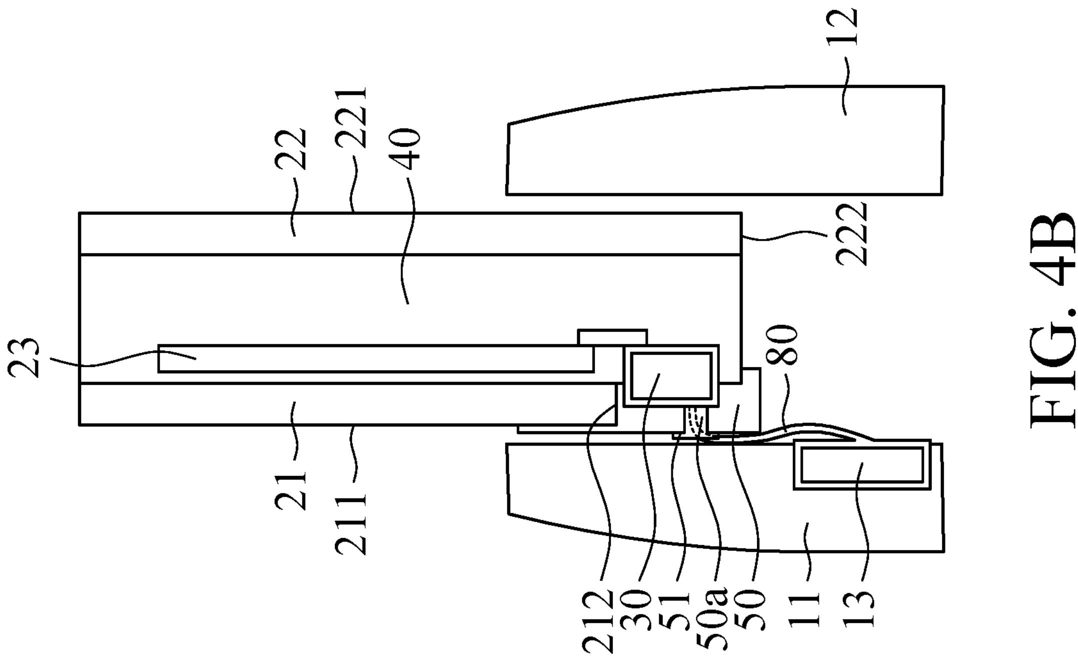
FIG. 4B
100
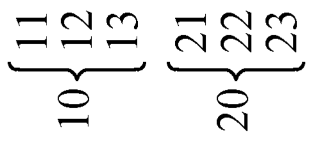
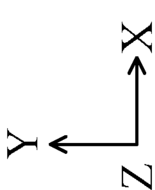

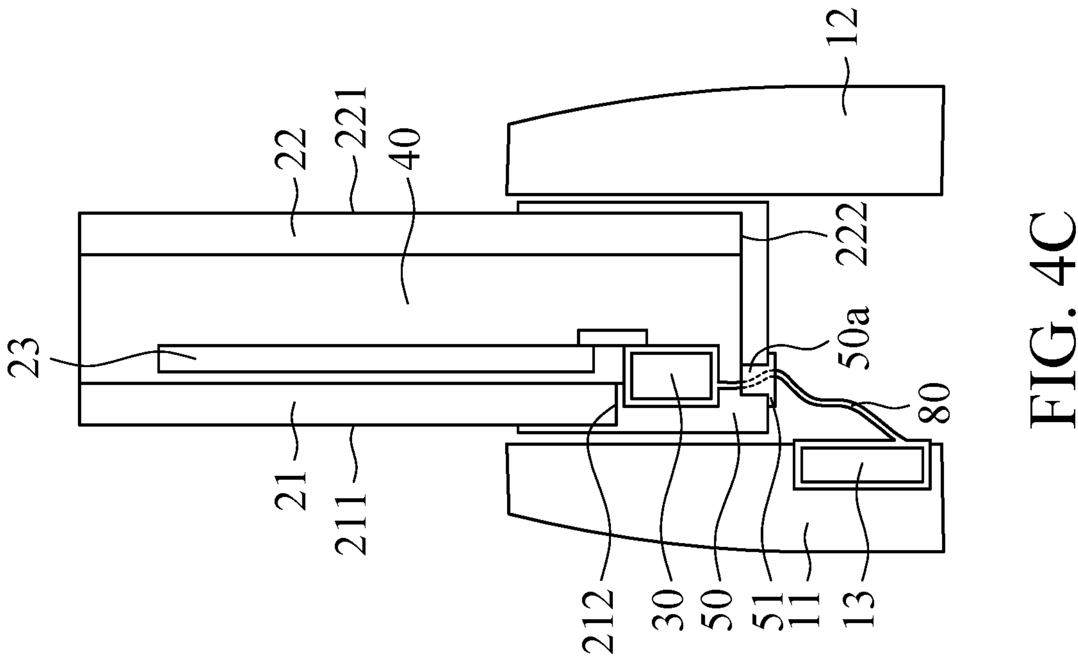
FIG. 4C
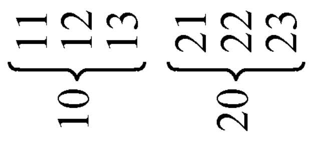
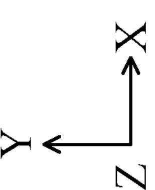

VEHICLE WINDOW ASSEMBLY HAVING DISPLAY DEVICE

CROSS REFERENCE TO RELATED APPLICATIONS

This application claims priority of China Patent Application No. 202211411027.0, filed on Nov. 11, 2022, the entirety of which is incorporated by reference herein.

BACKGROUND OF THE INVENTION

Field of the Invention

The invention relates to a vehicle electronic device, in particular to a vehicle electronic device with a protective element for protecting a signal element.

Description of the Related Art

With technology development, the vehicle window assembly may have a display function. However, outside moisture may enter the display panel or signal element in the vehicle window assembly, thereby affecting the display function of the vehicle window assembly.

Therefore, there is a need to develop a vehicle electronic device to solve the aforementioned problems.

BRIEF SUMMARY OF THE INVENTION

An embodiment of the present invention provides a vehicle electronic device, including a vehicle window assembly, a first signal element, and a first protective element. The vehicle window assembly comprises a first protective substrate, a second protective substrate, and a display panel. The display panel is disposed between the first protective substrate and the second protective substrate. The first signal element is electrically connected to the display panel. The first protective element covers at least one portion of the first signal element.

BRIEF DESCRIPTION OF THE DRAWINGS

The present invention may be more fully understood by reading the ensuing detailed description and examples with reference to the accompanying drawings, in which.

FIG. 1B shows a schematic view of the vehicle electronic device according to some embodiments of the present application;

FIG. 1C shows a schematic view of the vehicle electronic device according to some embodiments of the present application;

FIG. 4B shows a schematic view of the vehicle electronic device according to some embodiments of the present application;

FIG. 4C shows a schematic view of the vehicle electronic device according to some embodiments of the present application;

DETAILED DESCRIPTION OF THE INVENTION

Figure 1A:
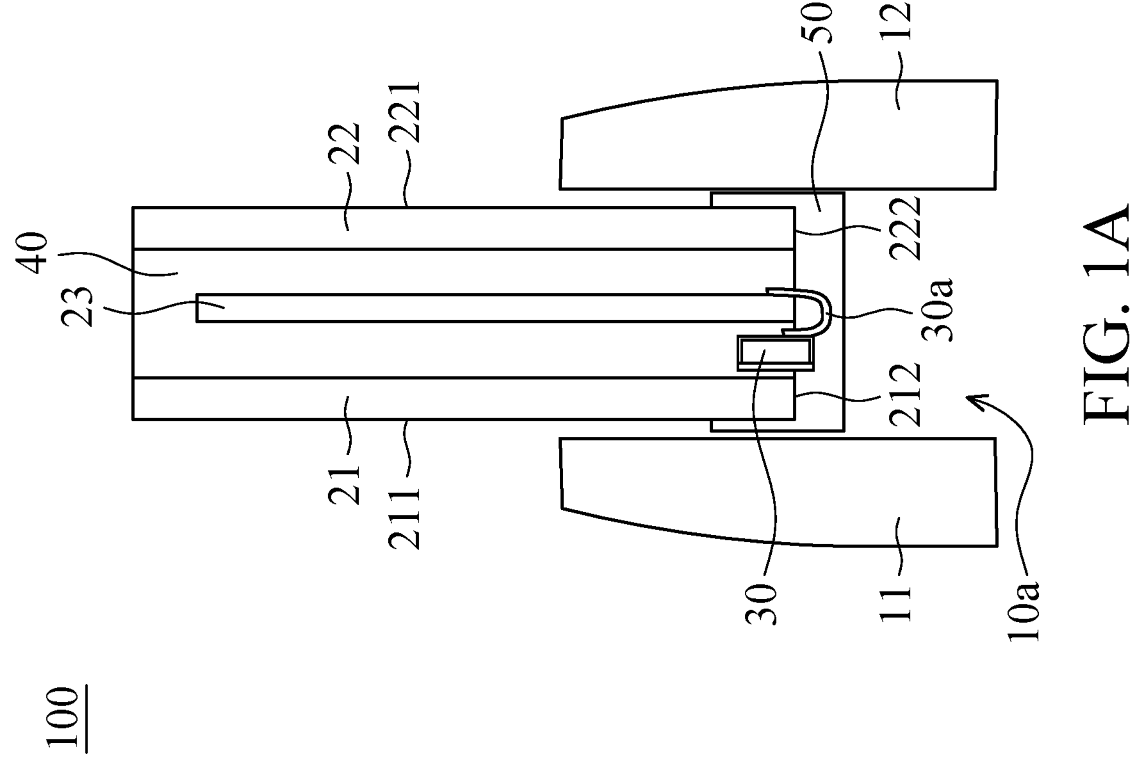
FIG. 1A shows a schematic view of a vehicle electronic device according to some embodiments of the present application.

The present disclosure may be more clearly understood by referring to the following description and the appended drawings. It should be noted that, for the sake of the simplicity of the drawings and comprehensibility for readers, only a portion of the light-emitting unit is illustrated in multiple FIGURES in the present disclosure, and the specific components in the FIGURES are not drawn to scale. In addition, the number and size of each component in the drawings merely serve as an example, and are not intended to limit the scope of the present disclosure. Furthermore, similar and/or corresponding numerals may be used in different embodiments for describing some embodiments simply and clearly, but they do not represent any relationship between different embodiments and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open-ended words, so they should be interpreted as meaning "including but not limited to . . . " Therefore, when the terms "including", "comprising", and/or "having" are used in the description of the disclosure, the presence of corresponding features, regions, steps, operations and/or components is specified without excluding the presence of one or more other features, regions, steps, operations and/or components.

In addition, in this specification, relative expressions may be used. For example, "lower", "bottom", "higher" or "top" are used to describe the position of one element relative to another. It should be noted that if a device is flipped upside down, an element that is "lower" will become an element that is "higher".

When a corresponding component (i.e. a film layer or region) is referred to as "on another component", it may be directly on another component, or there may be other components in between. On the other hand, when a component is referred "directly on another component", there is no component between the former two. In addition, when a component is referred "on another component", the two components have an up-down relationship in the top view, and this component can be above or below the other component, and this up-down relationship depends on the orientation of the device.

The terms “about,” “equal to,” “equivalent,” “the same as,” “essentially,” or “substantially” are generally interpreted as within 20% of a given value or range, or as interpreted as within 10%, 5%, 3%, 2%, 1%, or 0.5% of a given value or range.

In the present application, when mentioning that the A element overlaps the B element, it means to include at least partial overlap.

It should be understood that, although the terms “first”, “second” etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as “first” and “second” may not be used in the description to distinguish different elements. As long as it does not depart from the scope defined by the appended claims, the first element and/or the second element described in the appended claims can be interpreted as any element that meets the description in the specification.

In the present disclosure, the thickness, length, and width can be measured by using an optical microscope, and the thickness can be measured by the cross-sectional image in the electron microscope, but it is not limited thereto. In addition, a certain error may be present in a comparison with any two values or directions. If the first value is equal to the second value, the deviation between the first value and the second value may be within about 10%. If the first direction is perpendicular to the second direction, the angle between the first direction and the second direction may be between 80 degrees (≥80 degrees) and 100 degrees (≤100 degrees). If the first direction is parallel to the second direction, the angle between the first direction and the second direction may be between 0 degree (≥0 degree) and 10 degrees (≤10 degrees).

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one having ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

The electronic device may include a display device, a backlight device, an antenna device, a sensing device or a splicing device, but it is not limited thereto. The electronic device may be a bendable or flexible electronic device. The display device may be a non-self-luminous display device or a self-luminous display device. The antenna device may be a liquid crystal type antenna device or a non-liquid crystal type antenna device, and the sensing device may be a sensing device for sensing capacitance, light, thermal energy or ultrasonic waves, but it is not limited thereto. The electronic devices may include passive devices and active devices, such as capacitors, resistors, inductors, diodes, transistors, and the like. The diodes may include light emitting diodes or photodiodes. The light emitting diode may include, for example, an organic light emitting diode (OLED), a mini LED, a micro LED or a quantum dot LED, but it is not limited thereto. The splicing device may be, for example, a display splicing device or an antenna splicing device, but it is not limited thereto. It should be noted that, the electronic device may be any combination mentioned above, but it is not limited thereto. In the following, a display device is used as an electronic device or a splicing device to illustrate the content of the present application, but the present application is not limited thereto.

It should be noted that even though the present application mainly describes vehicle electronic devices, the vehicle electronic devices described in the present application may be replaced by electronic devices, carrying electronic devices, tablets, computers, wearable electronic devices, mobile phones, etc., but the present application is not limited thereto.

Please refer to FIG. 1A, FIG. 1A shows a schematic view of a vehicle electronic device 100 according to some embodiments of the present application. The following embodiments are described by taking a vehicle electronic device as an example. However, the electronic device of the present application is not limited to vehicles, and electronic devices for other purposes are also included within the scope of the present application.

As shown in FIG. 1A, the vehicle electronic device 100 may include a vehicle body assembly 10, a vehicle window assembly 20, a first signal element 30, an intermediate layer 40, and a first protective element 50. According to some embodiments of the present application, the display panel 23 may be a transparent display panel.

The vehicle body assembly 10 may be a structure of a vehicle. For example, the vehicle body assembly 10 may include a door inner body 11 and a door outer body 12. The door inner body 11 and the door outer body 12 may opposite to each other, and an accommodating space 10*a* may be formed between the door inner body 11 and the door outer body 12 to accommodate other elements of the vehicle electronic device 100.

Please refer to FIG. 1A, according to some embodiments of the present application, the vehicle window assembly 20 may be disposed in the accommodating space 10*a*. In other words, the vehicle window assembly 20 may be disposed between the door inner body 11 and the door outer body 12.

The vehicle window assembly 20 may include a first protective substrate 21, a second protective substrate 22, and a display panel 23. The first protective substrate 21 and the second protective substrate 22 may face each other. The display panel 23 may be disposed between the first protective substrate 21 and the second protective substrate 22. Moreover, the first protective substrate 21 may correspond to the door inner body 11, and the second protective substrate 22 may correspond to the door outer body 12.

That is, as shown in FIG. 1A, according to some embodiments of the present application, the first protective substrate 21 may be closer to the door inner body 11, and the first protective substrate 21 may be farther away from the door outer body 12. Moreover, according to some embodiments of the present application, the second protective substrate 22 may be closer to the door outer body 12, and the second protective substrate 22 may be farther away from the door inner body 11.

The first protective substrate 21 may include a first sidewall 211 and a first bottom wall 212. The first sidewall 211 may face toward the door inner body 11, and the first sidewall 211 may face away from the second protective substrate 22. For example, the first sidewall 211 may face toward the −X direction. The first bottom wall 212 may face downward, for example, the first bottom wall 212 may face toward the −Y direction. According to some embodiments, the X direction (the first direction) may be a direction that is perpendicular to the first protective substrate 21. According to some embodiments, the X direction may be a direction that is perpendicular to a substrate in the display panel 23. According to some embodiments, the X direction may be the thickness direction of the vehicle window assembly 20.

The second protective substrate 22 may include a second sidewall 221 and a second bottom wall 222. The second sidewall 221 may face toward the door outer body 12, and the second sidewall 221 may face away from the first protective substrate 21. For example, the second sidewall 221 may toward the +X direction. The second bottom wall 222 may face downward, for example, the second bottom wall 222 may face toward the −Y direction.

Please continue to refer to FIG. 1A, the display panel 23 may be disposed between the first protective substrate 21 and the second protective substrate 22. Moreover, according to some embodiments of the present application, the display panel 23 may not be in direct contact with the first protective substrate 21 and/or the second protective substrate 22.

As shown in FIG. 1A, according to some embodiments of the present application, an intermediate layer 40 may be disposed around the display panel 23 to fix the display panel 23 between the first protective substrate 21 and the second protective substrate 22. For example, according to some embodiments of the present application, the intermediate layer 40 may be polyvinyl butyral (PVB) glue, but the present application is not limited thereto. According to some embodiments, the intermediate layer 40 may be disposed between the first protective substrate 21 and the display panel 23, and may be disposed between the second protective substrate 22 and the display panel 23. The intermediate layer 40 may include an adhesive material, a glue material, a buffer material, a protective material, or a combination thereof. According to some embodiments, the intermediate layer 40 may have functions of adhesion, UV resistance, stress buffering, and so on.

According to some embodiments of the present application, the first signal element 30 may be disposed adjacent to the display panel 23. Moreover, the first signal element 30 may be electrically connected to the display panel 23 to transmit signals to the display panel 23.

In the embodiment shown in FIG. 1A, at least one portion of the first signal element 30 may be disposed between the first protective substrate 21 and the second protective substrate 22. Moreover, according to some embodiments of the present application, at least one portion of the first signal element 30 may be disposed between the display panel 23 and the first protective substrate 21. According to some embodiments, the first protective element 50 may cover at least one portion of the display panel 23.

The first signal element 30 may be partially surrounded by the intermediate layer 40. For example, the first signal element 30 may be partially surrounded by polyvinyl butyral glue (PVB glue). Moreover, according to some embodiments of the present application, the first signal element 30 may be electrically connected to the display panel 23 through a wire 30*a* of the first signal element 30.

As shown in FIG. 1A, the portion of the first signal element 30 that is exposed to the intermediate layer 40 may be covered by the first protective element 50 so that the first signal element 30 is not exposed to the outside. The first protective element 50 may cover at least one portion of the first signal element 30. In this way, the first signal element 30 may be prevented from being intruded by moisture, thereby improving the stability of the vehicle electronic device 100. According to some embodiments, the first protective element 50 may be a waterproof material. According to some embodiments, the first protective element 50 may include epoxy resin, organosilicon compounds, polyurethane (PU), acrylic acid, nano-coating, Polyvinyl butyral (PVB), polyvinyl alcohol (PVA), resin material, polymer material, polyvinyl chloride (PVC), polydimethylsiloxane (PDMS), polyethylene terephthalate (PET), poly (methyl methacrylate (PMMA), triacetate cellulose film (TAC Film), polyethylene naphthalate (PEN), polyether sulphone (PES), polycarbonate (PC), polyimide (PI), or a combination thereof.

Please refer to FIG. 1B, FIG. 1B shows a schematic view of the vehicle electronic device 100 according to some embodiments of the present application. In the embodiment shown in FIG. 1B, the first signal element 30 may be disposed on the outside of the vehicle window assembly 20.

Also, the first signal element 30 may not be surrounded by the intermediate layer 40. Moreover, according to some embodiments of the present application, the first signal element 30 may be electrically connected to the display panel 23 via the wire 30*a* of the first signal element 30.

As shown in FIG. 1B, the entire first signal element 30 may be covered by the first protective element 50 so that the first signal element 30 is not exposed to the outside. In this way, the first signal element 30 may be prevented from being intruded by moisture, thereby improving the stability of the vehicle electronic device 100.

Please refer to FIG. 1C, FIG. 1C shows a schematic view of the vehicle electronic device 100 according to some embodiments of the present application. In the embodiment shown in FIG. 1C, the first signal element 30 may be partially disposed between the display panel 23 and the second protective substrate 22, and the first signal element 30 may abut against the display panel 23.

Furthermore, the first signal element 30 may be partially surrounded by the intermediate layer 40. Moreover, according to some embodiments of the present application, since the first signal element 30 abuts against the display panel 23, the first signal element 30 may be directly electrically connected to the display panel 23.

As shown in FIG. 1C, the portion of the first signal element 30 that is exposed to the intermediate layer 40 may be covered by the first protective element 50 so that the first signal element 30 is not exposed to the outside. In this way, the first signal element 30 may be prevented from being intruded by moisture, thereby improving the stability of the vehicle electronic device 100.

Please continue to refer to FIG. 1A, the first protective element 50 may be disposed on the lower portion of the vehicle window assembly 20, so that the first protective element 50 may cover a portion of the first protective substrate 21 and at least one portion of the second protective substrate 22.

For example, as shown in FIG. 1A, the first protective element 50 may cover at least one portion of the first sidewall 211 of the first protective substrate 21, and the first protective element 50 may cover the first bottom wall of the first protective substrate 21 212.

The first protective element 50 may also cover at least one portion of the second sidewall 212 of the second protective substrate 22, and the first protective element 50 may also cover the second bottom wall 222 of the second protective substrate 22.

Moreover, the first protective element 50 may also cover a portion of the display panel 23 and the intermediate layer 40. For example, the lower portions of the display panel 23 and the intermediate layer 40 may be covered by the first protective element 50.

Since the upper portion and the sidewall of the display panel 23 may be surrounded by the intermediate layer 40, and the lower portion of the display panel 23 and the intermediate layer 40 may be covered by the first protective element 50, so that the display panel 23 is not exposed to the outside. In this way, the display panel 23 may be prevented from being intruded by moisture, thereby improving the stability of the vehicle electronic device 100.

Figure 2:
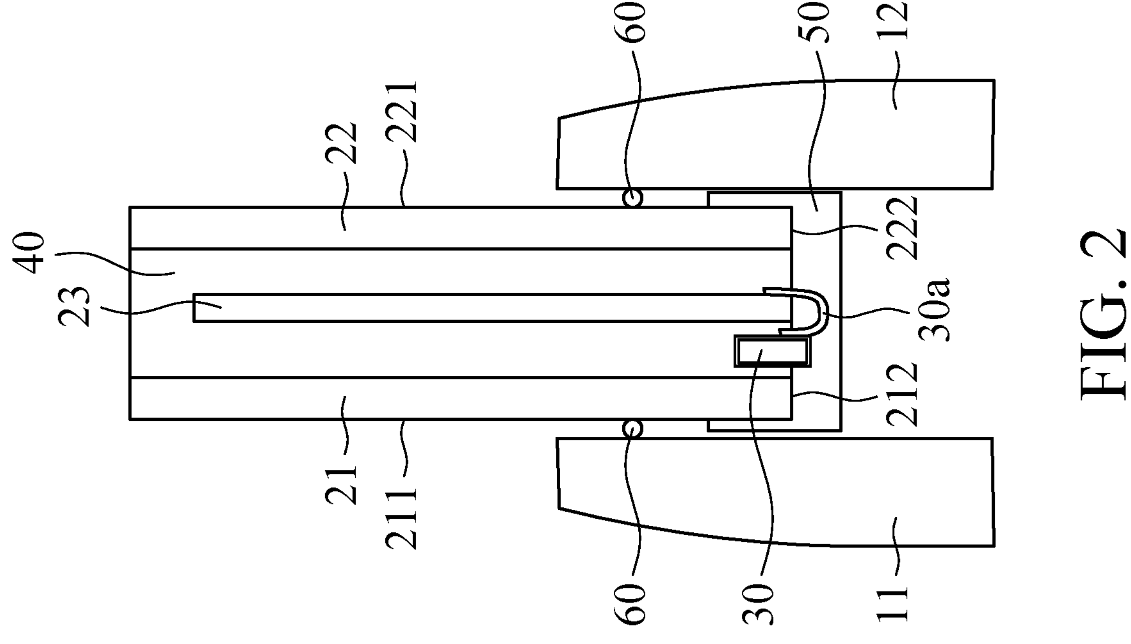
FIG. 2 shows a schematic view of the vehicle electronic device according to some embodiments of the present application.
Figure 2:
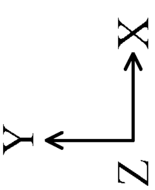

Please refer to FIG. 2, FIG. 2 shows a schematic view of the vehicle electronic device 100 according to some embodiments of the present application. As shown in FIG. 2, the electronic device 100 may further include a second protective element 60.

Please continue to refer to FIG. 2, according to some embodiments of the present application, the second protective element 60 may be disposed between the vehicle body assembly 10 and the vehicle window assembly 20, and the second protective element 60 may surround the vehicle window assembly 20. As shown in FIG. 2, the second protective element 60 may be in contact with the vehicle body assembly 10 and the vehicle window assembly 20.

According to some embodiments of the present application, the second protective element 60 may be fixedly disposed on the vehicle body assembly 10, and the second protective element 60 may abut against the vehicle window assembly 20 to prevent moisture from penetrating the second protective element 60.

According to some embodiments of the present application, the second protective element 60 may be fixedly disposed on the vehicle window assembly 20, and the second protective element 60 may abut against the vehicle body assembly 10 to prevent moisture from penetrating the second protective element 60. According to some embodiments, the second protective element 60 may be a waterproof material. According to some embodiments, the second protective element 60 may include epoxy resin, organosilicon compounds, polyurethane (PU), acrylic acid, nanocoating, polyvinyl butyral (PVB), polyvinyl alcohol (PVA), resin material, polymer material, polyvinyl chloride (PVC), polydimethylsiloxane (PDMS), polyethylene terephthalate (PET), poly (methyl methacrylate) (PMMA), triacetate cellulose film (TAC Film), polyethylene naphthalate (PEN), polyether sulphone (PES), polycarbonate (PC), polyimide (PI), or a combination thereof.

In this way, the display panel 23 and/or the first signal element 30 may be prevented from being intruded by moisture, thereby improving the stability of the vehicle electronic device 100.

Figure 3A:
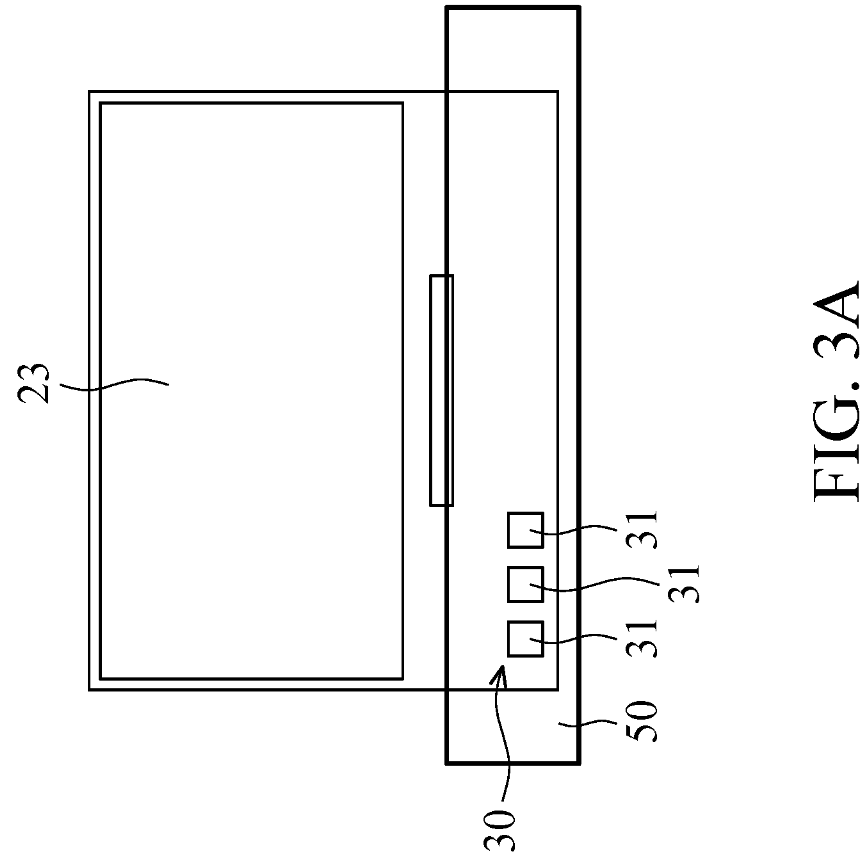
FIG. 3A shows a schematic view of a vehicle electronic device according to some embodiments of the present application.
Figure 3A:
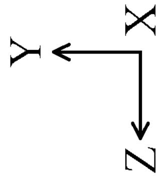

Please refer to FIG. 3A. FIG. 3A shows a schematic view of a vehicle electronic device 100 according to some embodiments of the present application. As shown in FIG. 3A, the first signal element 30 may include a transceiver 31.

According to some embodiments of the present application, the transceiver 31 of the first signal element 30 may include a receiving coil and/or a transmitting coil, so that the first signal element 30 may receive and/or transmit wireless signals.

As shown in FIG. 3A, the first protective element 50 may be disposed on the transceiver 31 of the first signal element 30. For example, according to some embodiments of the present application, the first protective element 50 may cover the transceiver 31 of the first signal element 30 so that the transceiver 31 of the first signal element 30 is not exposed to the outside.

According to some embodiments of the present application, the first protective element 50 may cover the receiving coil and/or the transmitting coil of the transceiver 31 of the first signal element 30, so that the receiving coil and/or the transmitting coil of the transceiver 31 of the first signal element 30 is not exposed externally. According to some embodiments, the first signal element 30 may include a plurality of transceivers 31, wherein each transceiver 31 may have a different signal frequency receiving range.

In this way, the transceiver 31 of the first signal element 30 may be prevented from being intruded by moisture, thereby improving the stability of the vehicle electronic device 100.

Figure 3B:
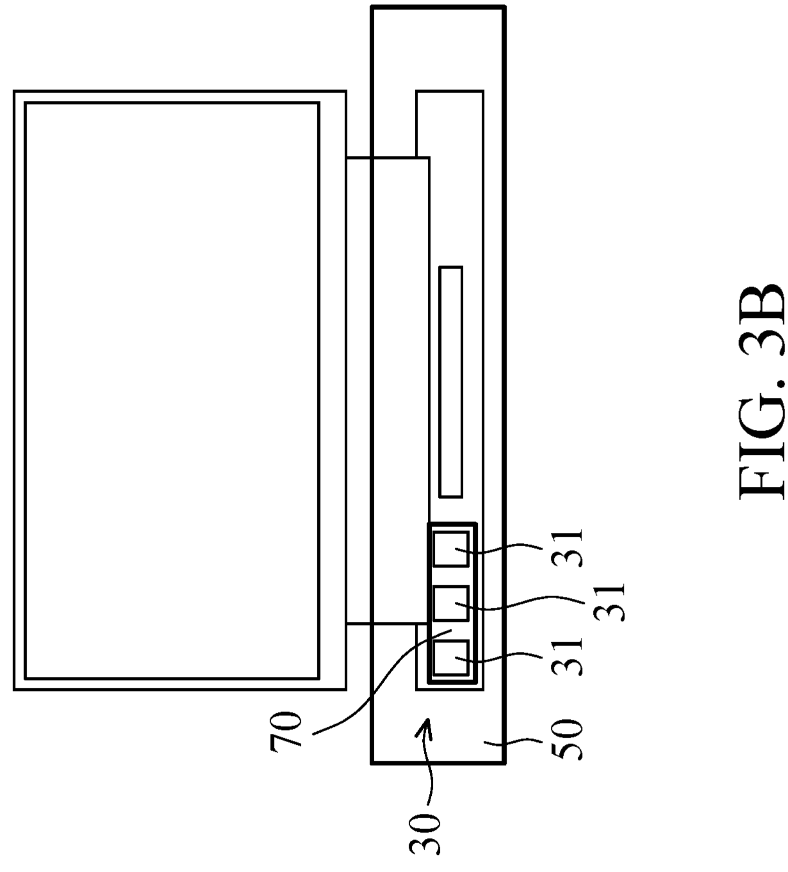
FIG. 3B shows a schematic view of the vehicle electronic device according to some embodiments of the present application.

Please refer to FIG. 3B, FIG. 3B shows a schematic view of the vehicle electronic device 100 according to some embodiments of the present application. As shown in FIG. 3B, the vehicle electronic device 100 may further include a third protective element 70.

As shown in FIG. 3B, the third protective element 70 may be disposed on the transceiver 31 of the first signal element 30. For example, according to some embodiments of the present application, the third protective element 70 may cover the transceiver 31 of the first signal element 30 so that the transceiver 31 of the first signal element 30 does not expose to the outside. According to some embodiments, the third protective element 70 may be a waterproof material, such as an encapsulation material. According to some embodiments, the third protective element 70 may be a coating material. According to some embodiments, the third protective element 70 includes silicon oxide, silicon nitride, silicon oxynitride, titanium dioxide ($TiO_2$), or a combination thereof. According to some embodiments, the third protective element 70 may be an inorganic material, an organic material, or a combination thereof. In order not to affect the signal transmission of the signal element, the third protective element 70 may be an insulating material.

According to some embodiments of the present application, the third protective element 70 may cover the receiving coil and/or the transmitting coil of the transceiver 31 of the first signal element 30, so that the receiving coil and/or the transmitting coil of the transceiver 31 of the first signal element 30 is not exposed externally. In this way, the transceiver 31 of the first signal element 30 may be prevented from being intruded by moisture, thereby improving the stability of the vehicle electronic device 100.

According to some embodiments, the first protective element 50, the second protective element 60, and the third protective element 70 may be the same. According to some embodiments, the first protective element 50, the second protective element 60, and the third protective element 70 may be different. According to some embodiments, two of the first protective element 50, the second protective element 60, and the third protective element 70 may be the same, while the other is different.

Please continue to refer to FIG. 3B, the first protective element 50 may be disposed on the third protective element 70. For example, according to some embodiments of the present application, the first protective element 50 may cover the third protective element 70 so that the third protective element 70 is not exposed to the outside. According to some embodiments, the first protective element 50 may cover the transceiver 31 of the first signal element 30.

That is, the third protective element 70 may be arranged between the first protective element 50 and the transceiver 31 of the first signal element 30, and the first protective element 50 may cover the transceiver 31 of the first signal element 30 and the third protective element 70.

In this way, the third protective element 70 and the first protective element 50 are arranged above the transceiver 31 of the first signal element 30, so as to further prevent the transceiver 31 of the first signal element 30 from being intruded by moisture, thereby improving the stability of the vehicle electronic device 100.

It should be noted that, according to some embodiments of the present application, the vehicle electronic device 100 may include one or more of the first protective element 50, the second protective element 60, and the third protective element 70.

Figure 4A:
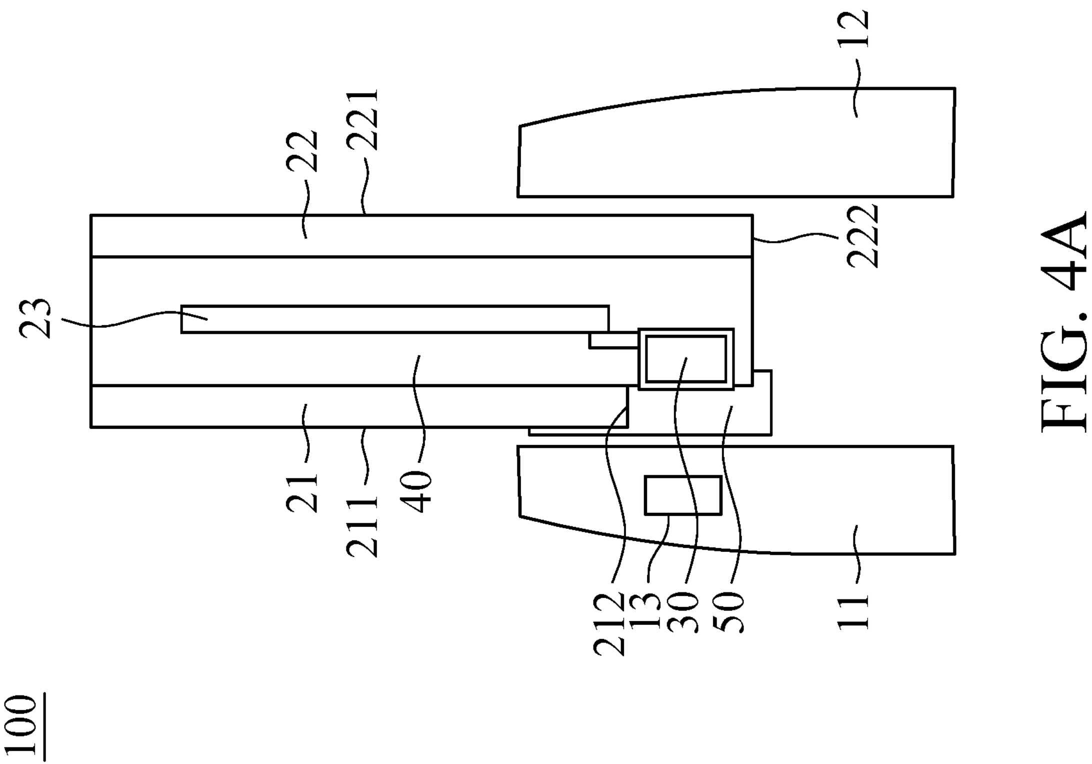
FIG. 4A shows a schematic view of the vehicle electronic device according to some embodiments of the present application.

Please refer to FIG. 4A. FIG. 4A shows a schematic view of the vehicle electronic device 100 according to some embodiments of the present application.

As shown in FIG. 4A, the first signal element 30 may not be disposed between the first protective substrate 21 and the second protective substrate 22. The first protective substrate 21 may be disposed on a plane formed by the Y axis and the Z axis. In detail, according to some embodiments of the present application, when viewed along a direction (for example, the X axis) that is perpendicular to the surface (YZ plane) of the first protective substrate 21, the first protective substrate 21 may not overlap the first signal element 30. According to some embodiments of the present application, when viewed along a direction (for example, X axis) that is perpendicular to the first protective substrate 21, the second protective substrate 22 may overlap the first signal element 30.

Please continue to refer to FIG. 4A, the first signal element 30 may be disposed adjacent to the lower portion of the first protective substrate 21. For example, the first signal element 30 may be disposed adjacent to the first bottom wall 212 of the first protective substrate 21. Moreover, a portion of the first signal element 30 that is exposed to the intermediate layer 40 may face toward the door inner body 11.

The portion of the first signal element 30 that is exposed to the intermediate layer 40 may be covered by the first protective element 50 so that the first signal element 30 is not exposed to the outside. In this way, the first signal element 30 may be prevented from being intruded by moisture, thereby improving the stability of the vehicle electronic device 100.

According to some embodiments of the present application, the first protective element 50 may be disposed at a lower portion of the first protective substrate 21. For example, the first protective element 50 may cover at least one portion of the first sidewall 211 of the first protective substrate 21, and the first protective element 50 may cover the first bottom wall 212 of the first protective substrate 21. However, in the embodiment of FIG. 4A, the first protective element 50 may not cover the second protective substrate 22. In this way, the volume of the first protective element 50 located at the lower portion of the vehicle window assembly 20 may be reduced, and the usage amount of the first protective element 50 may also be reduced. As shown in FIG. 4A, the vehicle body assembly 10 includes a second signal element 13, and the first signal element 30 and the second signal element 13 may communicate with each other to transmit a signal. In detail, the door inner body 11 of the vehicle body assembly 10 may include a second signal element 13, and the first signal element 30 and the second signal element 13 may perform wireless transmission to transmit signals. According to some embodiments, in the X direction, the first signal element 30 and the second signal element 13 may be at least partially overlapped to improve the effect of wireless transmission.

Please refer to FIG. 4B and FIG. 4C, FIG. 4B shows a schematic view of the vehicle electronic device 100 according to some embodiments of the present application; FIG. 4C shows a schematic view of the vehicle electronic device 100 according to some embodiments of the present application. As shown in FIG. 4B and FIG. 4C, the vehicle electronic device 100 may further include a wire 80, and the vehicle body assembly 10 may further include a second signal element 13.

As shown in FIG. 4B and FIG. 4C, according to some embodiments of the present application, the first signal element 30 and the second signal element 13 may communicate with each other to transmit a signal. According to some embodiments of the present application, the first signal element 30 may be electrically connected to the second signal element 13 through the wire 80, so that the first signal element 30 and the second signal element 13 may transmit signals through the wire 80.

Please continue to refer to FIG. 4B and FIG. 4C, the first protective element 50 may include an opening 50$a$. According to some embodiments of the present application, the opening 50$a$ of the first protective element 50 may correspond to the first signal element 30, and the opening 50$a$ of the first protective element 50 passes through the first protective element 50.

Moreover, when viewed along a direction (for example, the X axis) that is perpendicular to the first protective substrate 21, the first protective substrate 21 may not overlap the first signal element 30 and the opening 50$a$ of the first protective element 50.

That is, the portion of the first signal element 30 that is corresponding to the opening 50$a$ of the first protective element 50 may not be covered by the first protective element 50. Moreover, the opening 50$a$ of the first protective element 50 is not covered by the first protective substrate 21. Accordingly, the wire 80 may extend through the opening 50$a$ of the first protective element 50.

Please continue to refer to FIG. 4B and FIG. 4C, according to some embodiments of the present application, the vehicle electronic device may further include a filling material 51 disposed in the opening 50$a$ of the first protective element 50. According to some embodiments, the filling material 51 may be a waterproof material. According to some embodiments, the filling material 51 may include epoxy resin, organosilicon compounds, polyurethane (PU), acrylic acid, nano-coating, polyvinyl butyral (PVB), resin material, polymer material, or a combination thereof.

In this way, the connection (for example, electrical connection) between the first signal element 30 and other elements may be facilitated, and at the same time, the first signal element 30 may be prevented from being intruded by moisture, thereby improving the stability of the vehicle electronic device 100 sex.

According to some embodiments of the present application, the signals transmitted by the first signal element 30 and the second signal element 13 may be wireless charging signals and/or information signals, etc., but the present application is not limited thereto.

According to some other embodiments of the present application, the first signal element 30 and the second signal element 13 may also transmit signals wirelessly (for example, by using the transceiver 31 of the first signal element 30). Likewise, the signal transmitted by wireless transmission may be a wireless charging signal and/or an information signal, etc., but the present application is not limited thereto.

Figure 5A:
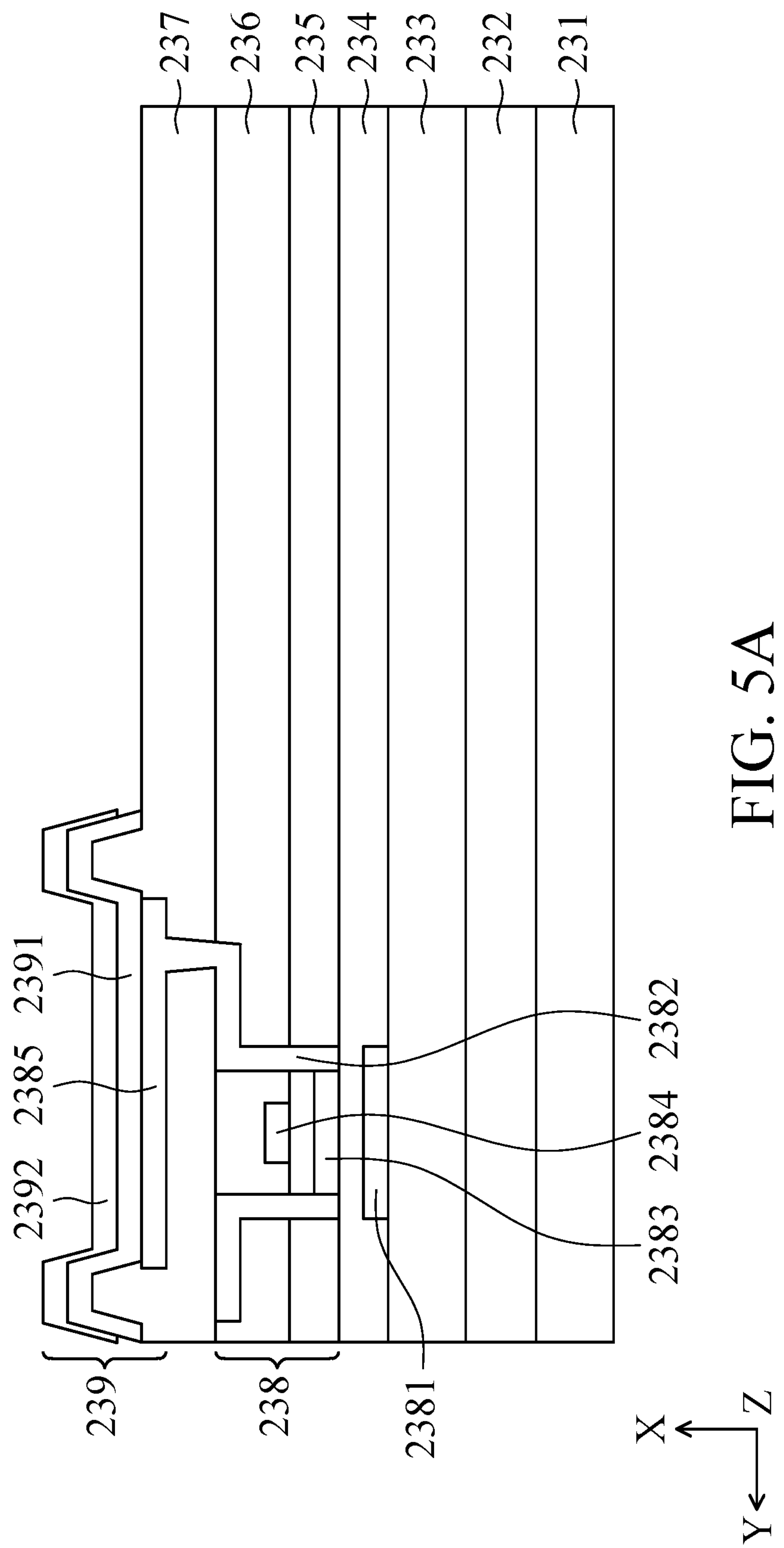
FIG. 5A shows a schematic view of the display panel of the vehicle electronic device according to some embodiments of the present application.
Figure 5B:
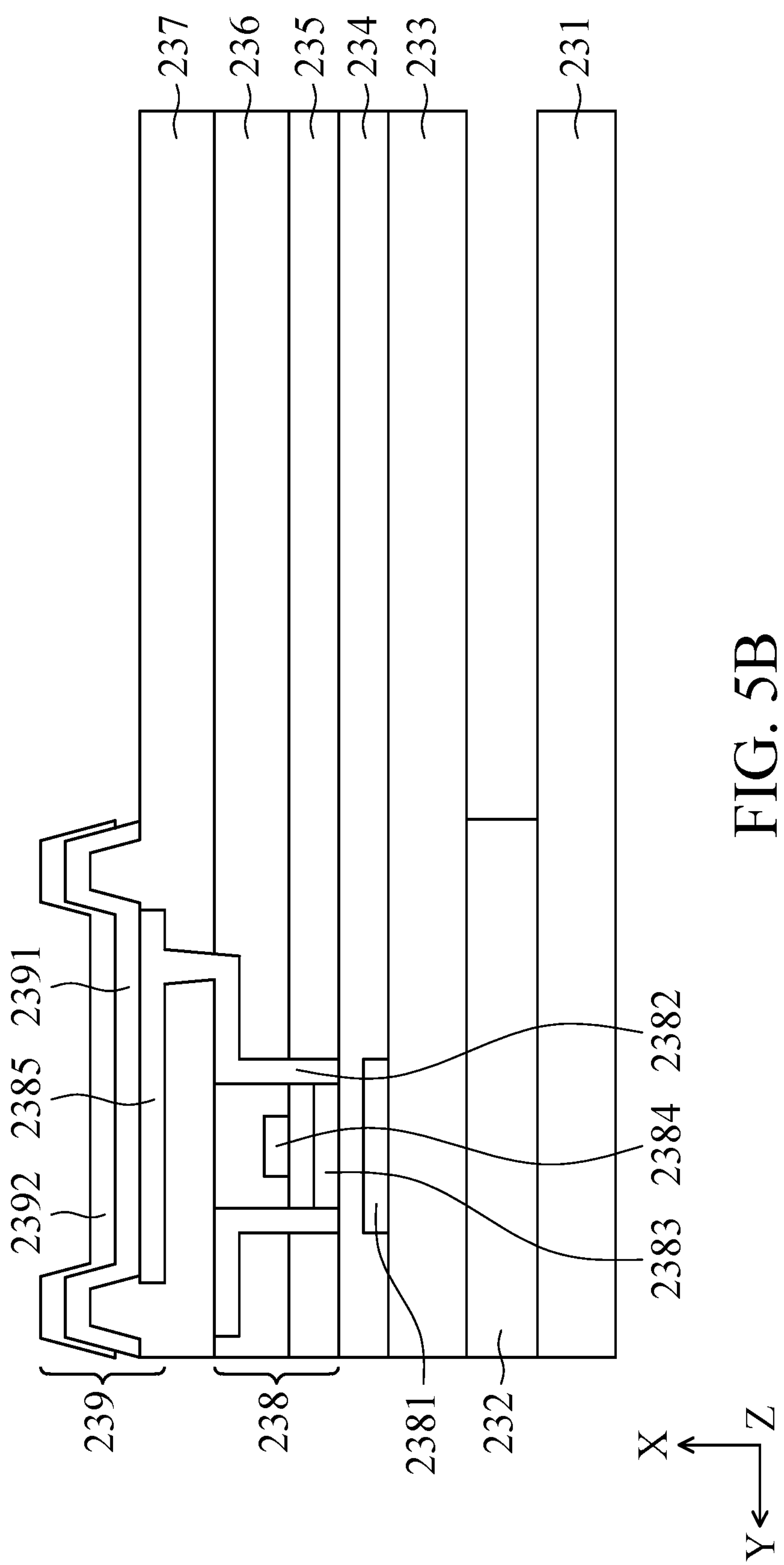
FIG. 5B shows a schematic view of the display panel of the vehicle electronic device according to some embodiments of the present application.

Please refer to FIG. 5A and FIG. 5B. FIG. 5A shows a schematic view of the display panel 23 of the vehicle electronic device 100 according to some embodiments of the present application; FIG. 5B shows a schematic view of the display panel 23 of the vehicle electronic device 100 according to some embodiments of the present application.

As shown in FIG. 5A and FIG. 5B, the display panel 23 may include a first substrate 231, an energy generation layer 232, a second substrate 233, a buffer layer 234, an insulating layer 235, a passivation layer 236, a planarization layer 237, a driving unit 238, and a display unit 239.

Please refer to FIG. 5A and FIG. 5B, the energy generating layer 232 may be disposed on the first substrate 231; the second substrate 233 may be disposed on the energy generating layer 232; and the buffer layer 234 may be disposed on the second substrate 233. The driving unit 238 may be disposed on the second substrate 233. The display unit 239 may be disposed on the driving unit 238, and the display unit 239 may be electrically connected to the driving unit 238. Moreover, the display unit 239 may be disposed on the planarization layer 237.

According to some embodiments of the present application, the first substrate 231 may be closer to the second protective substrate 22, and the first substrate 231 may be farther away from the first protective substrate 21. Also, the display unit 239 may be closer to the first protective substrate 21, and the display unit 239 may be farther away from the second protective substrate 22. According to other embodiments, the first substrate 231 may be closer to the first protective substrate 21, and the first substrate 231 may be farther away from the second protective substrate 22.

According to some embodiments of the present application, the energy generating layer 232 may be a solar energy conversion layer, but the present application is not limited thereto. In an embodiment where the energy generating layer 232 is a solar conversion layer, the energy generating layer 232 may receive sunlight and generate electricity to power the display panel 23.

As shown in FIG. 5A and FIG. 5B, the driving unit 238 may be a thin film transistor structure 238. The thin film transistor structure 238 may include a source/drain 2382, a semiconductor layer 2383, and a gate 2384. The display unit 239 may include an anode 2385, an organic light emitting diode (OLED) light-emitting layer 2391, and a cathode 2392. The display unit 239 may be electrically connected to the drain 2382 of the driving unit 238 via the anode 2385.

As shown in FIG. 5A, a light shielding layer 2381 may be disposed on the second substrate 233, the buffer layer 234 may be disposed on the light shielding layer 2381, and the thin film transistor structure 238 may be disposed on the buffer layer 234. FIG. 5A takes the thin film transistor structure 238 as an example with the top gate, but the present application is not limited thereto. For example, the insulating layer 235 may be disposed between the semiconductor layer 2383 and the gate 2384, and the passivation layer 236 may be disposed over the gate 2384. The planarization layer 237 may be disposed over the source/drain 2382. One of the source/drain 2382 may be electrically connected to the display unit 239.

The display unit 239 may be disposed on the planar layer 237, and the organic light emitting diode light emitting layer 2391 may be disposed between the anode 2385 and the cathode 2392.

As shown in FIG. 5A, in the embodiment shown in FIG. 5A, the energy generating layer 232 may extend beyond the thin film transistor structure 238 and/or the display unit 239 so that the energy generating layer 232 may generate more power.

As shown in FIG. 5B, in the embodiment shown in FIG. 5B, the energy generating layer 232 may not extend beyond the thin film transistor structure 238 and/or the display unit 239, so that the display panel 23 may be more clear and transparent, so as to obtain better user experience.

Figure 6:
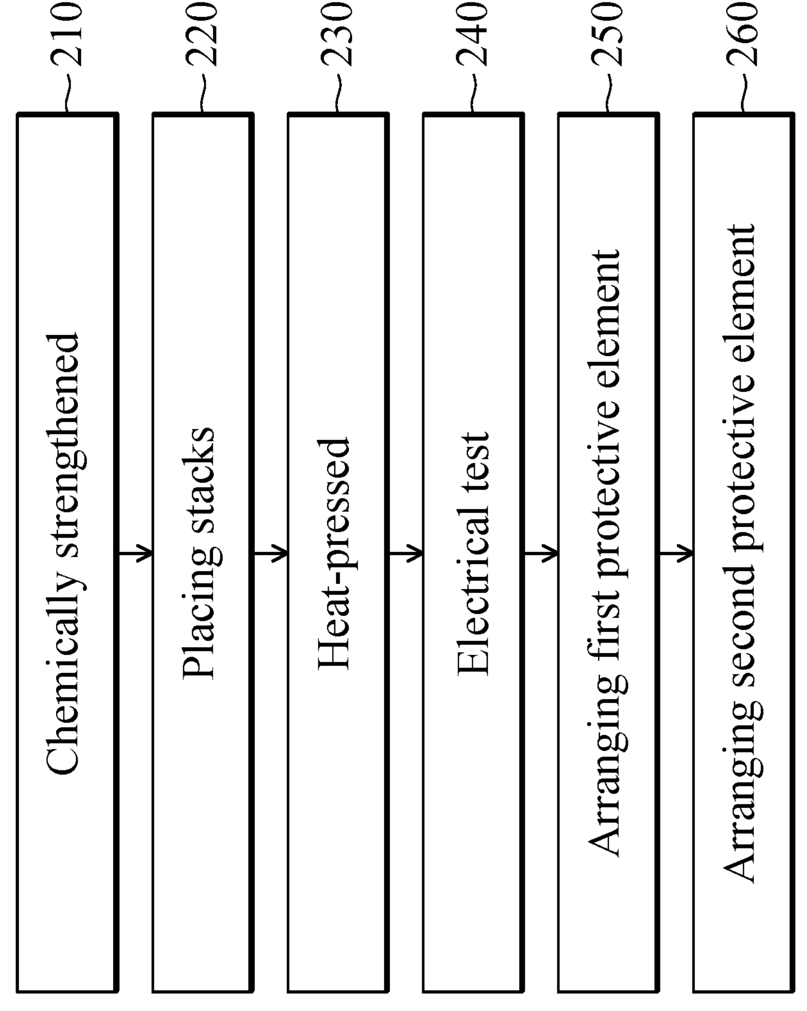
FIG. 6 shows a schematic view of a method for forming the vehicle electronic device according to some embodiments of the present application.

Please refer to FIG. 6. FIG. 6 shows a schematic view of a method 200 for forming the vehicle electronic device 100 according to some embodiments of the present application. The method flow in FIG. 6 is only a specific embodiment of the manufacturing method of the electronic device of the present application, but the present application is not limited thereto.

The method 200 may start at step 210. In step 210, the first protective substrate 21 and the second protective substrate 22 are prepared, and the first protective substrate 21 and the second protective substrate 22 may be chemically strengthened. Then, it may go to step 220.

In step 220, the stacks are placed. Please refer to FIG. 1 and FIG. 6 at the same time, the intermediate layer 40 is disposed above the second protective substrate 22; the display panel 23 and the first signal element 30 are disposed above the intermediate layer 40; the intermediate layer 40 is disposed above the display panel 23 and the first signal element 30; the first protective substrate 21 is disposed above the intermediate layer 40. Then, it may go to step 230.

In step 230, the structure formed in step 220 is heat-pressed. For example, in step 230, the structure formed in step 220 may be heated, and the heating temperature may be in the range of 50° C. to 350° C., for example, in the range of 80° C. to 250° C., for example, in the range of 100° C. to 220° C. Then, it may go to step 240.

In step 240, an electrical test is performed on the display panel 23 and the first signal element 30. After passing the electrical test, then, it may go to step 250.

In step 250, the first protective element 50 is disposed. According to some embodiments of the present application, the arrangement of the first protective element 50 may be as described above. In this way, the vehicle electronic device may achieve a waterproof effect and may protect signal elements. Then, it may go to step 260.

In step 260, the second protective element 60 is disposed. The arrangement of the second protective element 60 may be as described above. In this way, the vehicle electronic device may achieve a further waterproof effect.

In conclusion, in the vehicle electronic device according to the embodiment of the present application, the vehicle window assembly includes a display panel, the first signal element is electrically connected to the display panel, and the first protective element may cover at least one portion of the first signal element. In this way, the vehicle electronic device according to the embodiment of the present application may prevent the first signal element from being intruded by moisture, thereby improving the stability of the vehicle electronic device. According to some embodiments, the vehicle electronic device includes a vehicle body assembly, the vehicle body assembly includes a second signal element, and the first signal element and the second signal element may perform wireless transmission, which may prevent the signal element from being intruded by moisture, and may obtain better user experience.

It should be noted that, as long as the features of the various embodiments of the present application do not violate the spirit of the application or conflict, they may be mixed and matched arbitrarily.

Although the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A vehicle electronic device, comprising:
- a vehicle window assembly, comprising:
- a first protective substrate;
- a second protective substrate; and
- a display panel, disposed between the first protective substrate and the second protective substrate;
- a first signal element, electrically connected to the display panel;
- a first protective element, covering at least one portion of the first signal element;
- a vehicle body assembly; and
- a second protective element, surrounding the vehicle window assembly;
- wherein the second protective element is in contact with the vehicle window assembly and the vehicle body assembly.

2. The vehicle electronic device as claimed in claim 1,
- wherein the first protective substrate comprises a first bottom wall,
- wherein the first protective element covers the first bottom wall.

3. The vehicle electronic device as claimed in claim 1,
- wherein the first protective substrate comprises a first sidewall, and the first sidewall faces away from the second protective substrate,
- wherein the first protective element covers a portion of the first sidewall.

4. The vehicle electronic device as claimed in claim 1, wherein the first protective element covers at least one portion of the display panel, and at least one portion of the first signal element is disposed between the first protective substrate and the second protective substrate.

5. The vehicle electronic device as claimed in claim 1, wherein the first protective element covers at least one portion of the second protective substrate.

6. The vehicle electronic device as claimed in claim 1, wherein the display panel is a transparent display panel.

7. The vehicle electronic device as claimed in claim 1, further comprising a vehicle body assembly,
- wherein the vehicle body assembly comprises a second signal element,
- wherein the first signal element and the second signal element communicate with each other to transmit signals.

8. The vehicle electronic device as claimed in claim 7,
- wherein the first signal element and the second signal element transmit the signal wirelessly.

9. The vehicle electronic device as claimed in claim 1, further comprising:
- a vehicle body assembly, comprising a second signal element; and
- a wire, wherein the first protective element comprises an opening, and the wire passes through the opening of the first protective element,
- wherein the first signal element is electrically connected to the second signal element via the wire.

10. The vehicle electronic device as claimed in claim 9, further comprising a filling material disposed in the opening of the first protective element.

11. The vehicle electronic device as claimed in claim 9, wherein when viewed along a direction that is perpendicular to the first protective substrate, the first protective substrate does not overlap the first signal element and the opening of the first protective element.

12. The vehicle electronic device as claimed in claim 1, further comprising a third protective element,
- wherein the first signal element comprises a transceiver,
- wherein the third protective element covers the transceiver of the first signal element.

13. The vehicle electronic device as claimed in claim 12, wherein the first protective element covers the third protective element and the transceiver of the first signal element.

14. The vehicle electronic device as claimed in claim 12, wherein the third protective element is disposed between the first protective element and the transceiver of the first signal element.

15. The vehicle electronic device as claimed in claim 1, the display panel comprises:
- a first display substrate; and
- an energy generation layer, disposed on the first display substrate,
- wherein the energy generating layer receives sunlight and generate electricity to power the display panel.

16. The vehicle electronic device as claimed in claim 15, wherein the display panel further comprises:
- a second display substrate;
- a driving unit, disposed on the second display substrate; and
- a display unit, disposed on the driving unit, and electrically connected to the driving unit,
- wherein the display unit is closer to the first protective substrate, and the display unit is farther away from the second protective substrate.

17. The vehicle electronic device as claimed in claim 16, the driving unit further including a plurality of thin film transistor structures, wherein the energy generating layer extends beyond the display unit.

18. The vehicle electronic device as claimed in claim 16, the driving unit further including a plurality of thin film transistor structures, wherein the energy generating layer does not extend beyond the display unit.

19. The vehicle electronic device as claimed in claim 16, wherein the first substrate is closer to the first protective substrate, and the first substrate is farther away from the second protective substrate.

20. A vehicle electronic device, comprising:
- a vehicle window assembly, comprising:
- a first protective substrate;
- a second protective substrate; and
- a display panel, disposed between the first protective substrate and the second protective substrate;

a first signal element, electrically connected to the display panel;

a first protective element, covering at least one portion of the first signal element;

a vehicle body assembly, comprising a second signal element; and a wire, wherein the first protective element comprises an opening, and the wire passes through the opening of the first protective element, wherein the first signal element is electrically connected to the second signal element via the wire, wherein when viewed along a direction that is perpendicular to the first protective substrate, the first protective substrate does not overlap the first signal element and the opening of the first protective element.

* * * * *